United States Patent
Fujita (10) Patent No.: US 6,714,547 B1
(45) Date of Patent: Mar. 30, 2004

(54) QUALITY-ENSURING ROUTING TECHNIQUE

(75) Inventor: Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/497,233

(22) Filed: Feb. 3, 2000

(30) Foreign Application Priority Data

Feb. 4, 1999 (JP) .......................................... 11-027894

(51) Int. Cl.[7] .............................................. H04L 12/28
(52) U.S. Cl. .................................. 370/395.52; 370/395.5
(58) Field of Search ........................ 370/395.5, 395.52, 370/408, 410, 402–406, 466, 467, 216–241, 395.64, 395.65

(56) References Cited

U.S. PATENT DOCUMENTS

| | | | |
|---|---|---|---|
| 5,610,904 A | * 3/1997 | Eng et al. ................... | 370/408 |
| 6,009,097 A | * 12/1999 | Han ....................... | 370/395.52 |
| 6,016,319 A | * 1/2000 | Kshirsagar et al. ......... | 370/410 |
| 6,144,661 A | * 11/2000 | Katsube et al. ............. | 370/408 |
| 6,151,319 A | * 11/2000 | Dommety et al. ..... | 370/395.52 |
| 6,252,853 B1 | * 6/2001 | Ohno ........................ | 370/227 |
| 6,343,083 B1 | * 1/2002 | Mendelson et al. ...... | 370/395.5 |
| 6,490,244 B1 | * 12/2002 | Pegrum et al. ............. | 370/216 |
| 6,643,254 B1 | * 11/2003 | Kajitani et al. ............. | 370/217 |

FOREIGN PATENT DOCUMENTS

| | | |
|---|---|---|
| JP | 7-250081 | 9/1995 |
| JP | 10-164119 | 6/1998 |

OTHER PUBLICATIONS

The Institute of Electronics, Information and Communication Engineers—Technical Report of IEICE–SSE93–11 (May.. 1993).

The Institute of Electronics, Information and Communication Engineers—Technical Report of IEICE–SSE98–225, IN98–197 (Mar. 1999).

The Institute of Electronics, Information and Communication Engineers—Technical Report of IEICE–SSE95–126 (Dec. 1995).

Iwata et al., PNNI Routing Schemes for ATM Internet, NEC Giho, vol. 49, No. 7/1996—pp. 68–72.

Tsuzuki, "ATM Network Design: Traffic Control and Congestion Control", NIKEI Communications, (Oct. 1997).

* cited by examiner

Primary Examiner—Salvatore Cangialosi
(74) Attorney, Agent, or Firm—Foley & Lardner (57) ABSTRACT

A routing information notifying method improving the efficiency of a network composed of an IP network including an ATM network is disclosed. A virtual circuit (VC) is initially established in the ATM network. The IP network is notified about link resource information of the ATM network in such a way that an alternative route to the virtual circuit in the ATM network is searched for and then the IP network is notified about a link resource of the alternative route found in the ATM network to ensure the required QoS.

31 Claims, 8 Drawing Sheets

QUALITY-ENSURING ROUTING TECHNIQUE

BACKGROUND OF THE INVENTION

1. Field of the Invention

The present invention relates to routing techniques with Quality of Service (QoS) support, and more particularly to a routing technique for use in a connectionless network including a connection-oriented network and a router connecting the connectionless network and the connection-oriented network.

2. Description of the Related Art

A routing information notifying method with QoS support has been used to exchange link resource information between routers in an IP (Internet Protocol) network, which is described in Internet Draft (September. 1997) identified by "http!/www.ctron.com/support/internet/Internet -Drnat/draft-zhang-qos-ospf-01. txt". More specifically, In the IP network composed of a plurality of routers connected through links, the routers can exchange topology information and link resource information for each link with one another. The link resource information includes information of the resources available and information of the resources which have boon reserved. Therefore, each router can obtain the link resource information between any two of all the routers within the IP network.

On the other hand, there has been proposed a routing technique for use in a network composed of IP network and ATM network. For example, In Japanese Patent Unexamined Publication No. 07-250081, a path management method in ATM-LAN network. More specifically, in an ATM-LAN network composed of a plurality of routers and ATM switches which are connected through a permanent virtual circuit (PVC) established based on ATM interface, a path control server is provided which includes an information managing means and an information setting means. The information managing means manages path management information consisting of the routing information for each router and the connection information for each ATM switch. The information setting means outputs the routing and connection information to each router and ATM switch through connection lines to register them onto them. When the network configuration of the ATM-LAN network is changed, path management information 1S updated and new routing information and connection information which arc used to set routers and ATM switches which should change in setting information are obtained from the updated path management information In this prior art, all the routers and ATM switches are managed in a unified way to allow easy and efficient maintenance thereof.

As another example, a router which allows frame transfer efficiency to be improved in a network composed of an IP network including an ATM network is disclosed in Japanese Patent Unexamined Publication No. 10-164119.

In such a network composed of IP network and ATM network, especially a network composed of an IP network including an ATM network, the QoS routing as described before develops some problems. The details will be described with reference to FIG. 1.

Figure 1:
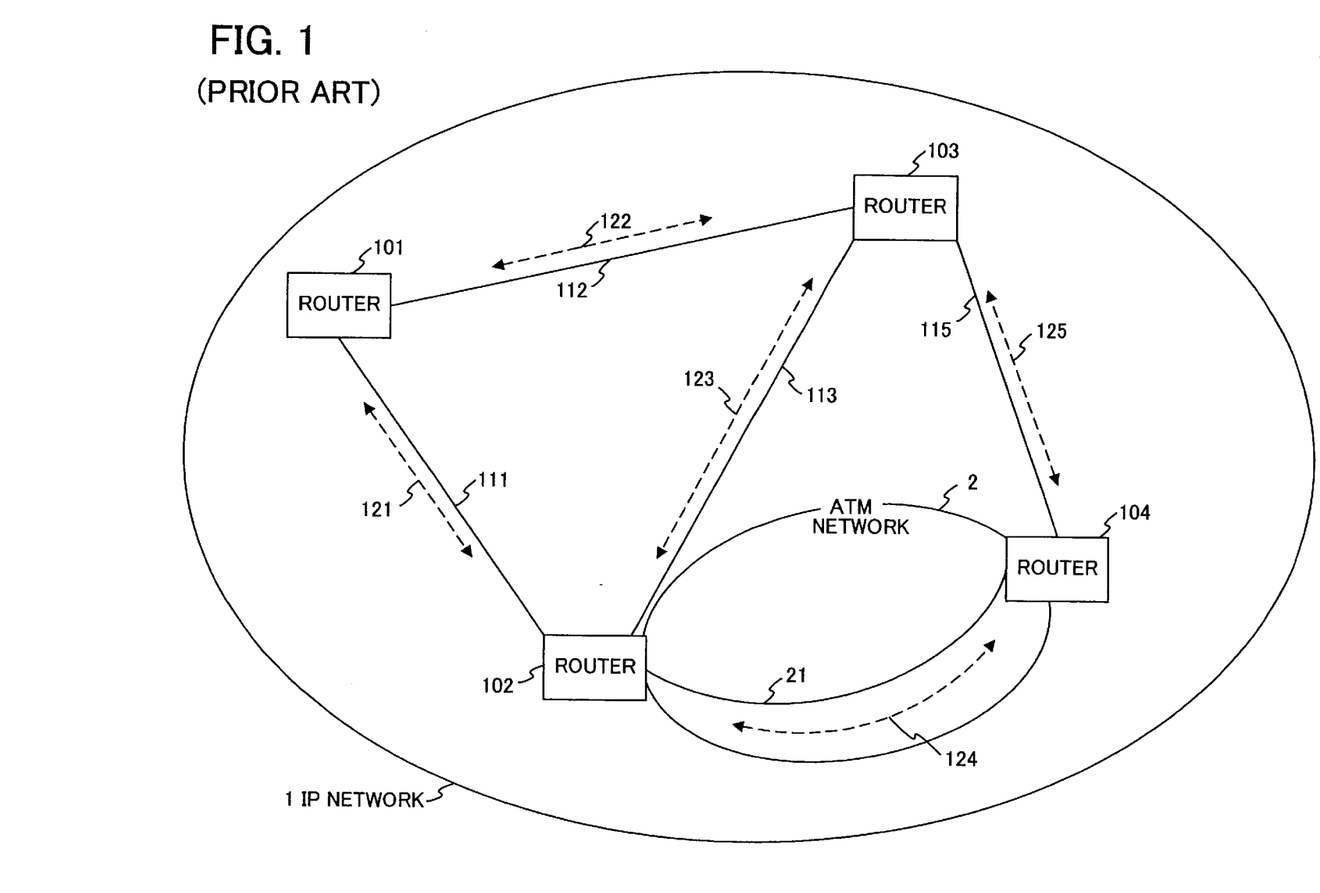
FIG. 1 is a schematic diagram showing a basic configuration of a network composed of an IP network and an ATM network for explanation of a conventional routing information notifying method.

As shown in FIG. 1, assuming that a network is composed of an IP network 1 including an ATM network 2. The IP network 1 is composed of a plurality of routers 101–104 connected through links 111–113 and 115 and the ATM network 2. The ATM network 2 is composed of a plurality of ATM switches (not shown). As described above, the routers 101–104 can exchange topology information and link resource information for each link with one another according to routing protocols 121–125 Therefore, each router can obtain the link resource information between any two of all the routers within the IP network.

In this example, the routers 102 and 104 are connected through a virtual circuit (VC) 21 which is initially established in the ATM network 2. In such a network, the default VC 21 is used as a link connecting the routers 102 and 104. Therefore, as to link resource information between the routers 102 and 104, the IP network 1 is notified about only the link resource information of the default VC 21.

In the conventional routing information notifying method, however, even when the link resource of the default VC 21 does not meet the QoS needs, the IP network 1 is notified about only the link resource information of the VC 21. Further, even when there Is another route available in the ATM network 2, the IP network 1 is notified about only the link resource information of the default VC 21. Therefore, the IP network 1 cannot use an available route other than the default VC 21 in the ATM network 2, resulting in reduced efficiency of tho network.

In the case where the IP network 1 is notified about the link resource information of all possible alternative routes in the ATM network 2, a large amount of information is transferred In the IP network 1, which may increase transaction load on routers. Especially, in the case of a large scale ATM network, it becomes difficult to realize the conventional routing information notification. Further, most of the routing information to be transferred are not used actually. Therefore, it is very important to determine how to notify the IP network about the link resource information of the alternative routes in the ATM network.

SUMMARY OF THE INVENTION

It is an object of the present invention to provide a quality-ensuring routing method and a router, which are capable of improving the efficiency of a network composed of a connectionless network including a connection-oriented network.

It is another object of the present invention to provide a quality-ensuring routing method and a router, which are capable of efficiently notifying a connectionless network about link resource information of a connection-oriented network.

It is still another object of the present invention to provide a routing information notifying method and a router, which are capable of notifying a connectionless network about necessary link resource information of possible alternative routes existing in a connection-oriented network.

According to the present invention, in a network composed of a connectionless network including a connection-oriented network, wherein at least two routers are connected to each other through a virtual circuit established in the connection-oriented network, the connectionless network is notified about link resource Information of the connection-oriented network in such a way that an alternative route to the virtual circuit in the connection-oriented network is searched For and the connectionless network is notified about a link resource of the alternative route found in the connection-oriented network.

The connectionless network may be notified about link resources of all alternative routes found in the connection-oriented network.

Preferably, a link resource of each route in the connection-oriented network is computed and an alternative route satisfying required quality is searched for based on the link resource of each route.

Further preferably, a link resource of each route in the connection-oriented network is computed and an alternative route having a link resource exceeding a link resource of the virtual circuit is searched for based on the link resource of each route.

According to another aspect of the present invention, the connectionless network is notified about link resource information of the connection-oriented network in such a way that when the link resource of the virtual circuit satisfies required quality, the connectionless network is notified about only the link resource of the virtual circuit and, when the link resource of the virtual circuit does not satisfy the required quality, an alternative route to the virtual circuit in the connection-oriented network is searched for, and then the connectionless network is notified about a link resource of the alternative route found in the connection-oriented network.

Preferably, a link resource of each route in the connection-oriented network is computed and then an alternative route satisfying required quality is searched for based on the link resource of each route.

Further preferably, a link resource of each route in the connection-oriented network is computed and then an alternative route having a link resource exceeding a link resource of the virtual circuit is searched for based on the link resource of each route.

Furthermore preferably, a link resource of a previously selected route in the connection-oriented network is computed and then an alternative route satisfying required quality is searched for based on the link resource of the previously selected route. In this searching step, an alternative route having a link resource capable of covering a short fall of the virtual circuit in link resource is preferably searched for.

DESCRIPTION OF THE PREFERRED EMBODIMENTS

Embodiments of the present invention which will be described hereafter are predicated on a network composed of a connectionless network including a connection-oriented network. Here, the connectionless network is an IP network 1 and the connection-oriented network is an ATM network 2 as shown in FIG. 1. It to assumed for simplicity that the IP network 1 is composed of a plurality of routers 101–104 connected through links 111–113 and 115 and the ATM network 2.

As described above, the routers 101–104 can exchange topology information and link resource Information for each link with one another according to routing protocols 121–125. The link resource information includes Information of the resources available and information of the resources which have been reserved, where one of the resources is bandwidth. The information exchanged according to routing protocols are distributed to all the routers within the IP network. In this example, the routers 102 and 104 are connected through a virtual circuit (VC) 21 that is a default VC initially established in the ATM network 2.

Figure 2:
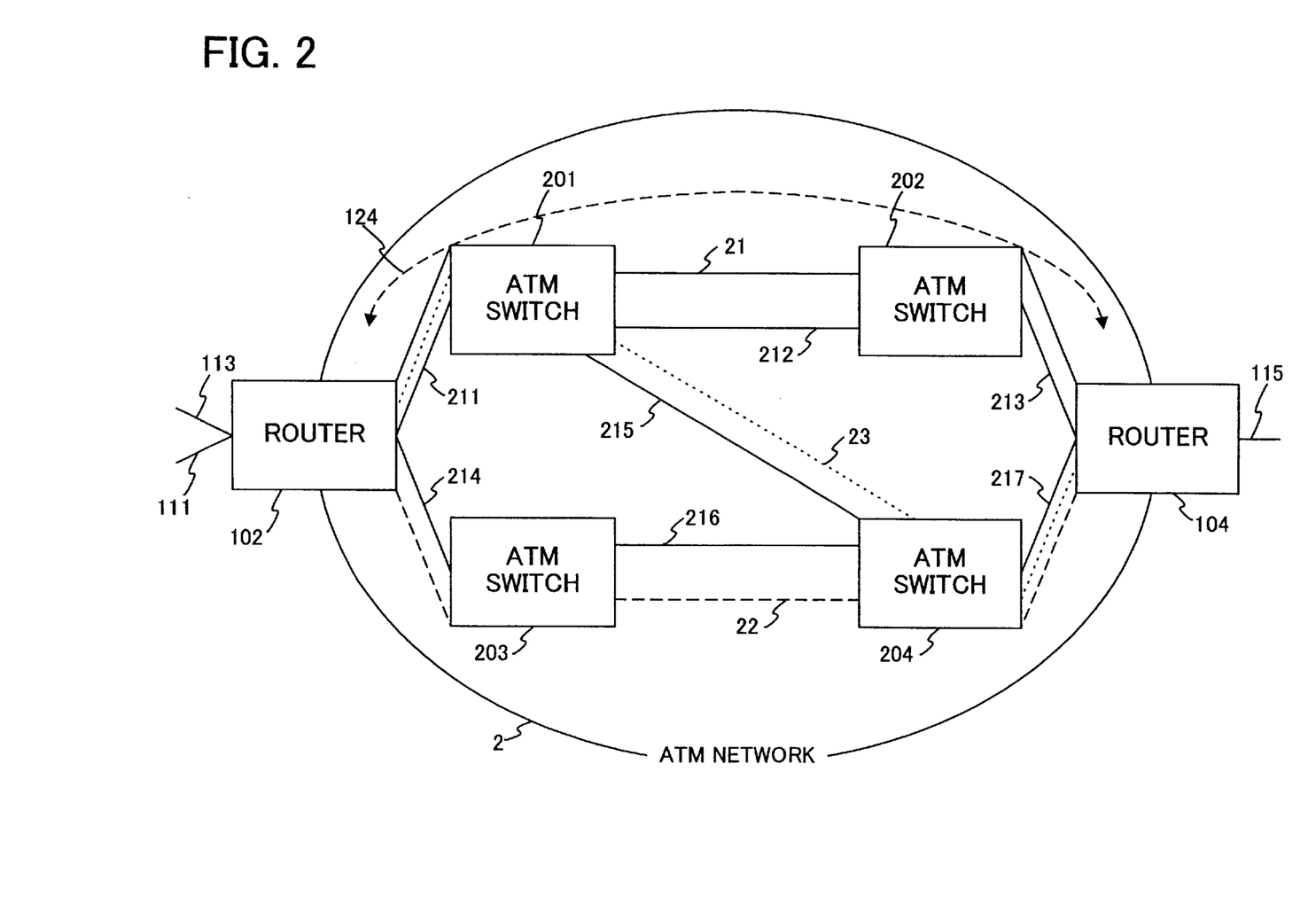
FIG. 2 is a schematic diagram showing a configuration of an ATM network included in an IP network for explanation of a routing information notifying method according to the present invention.

Referring to FIG. 2, it is assumed that the ATM network 2 is composed of a plurality of ATM switches 201–204 and the routers 102 and 104. The router 102 connected to links 111 and 113 in the IP network 1 is connected to the ATM switches 201 and 203 through links 211 and 214, respectively. The ATM switch 201 is further connected to the ATM switches 202 and 204 through links 212 and 215, respectively. Tho ATM switch 203 is further connected to the ATM switch 204 through a link 216. The ATM switch 204 is further connected to the router 104 through a link 217. The ATM switch 202 is further connected to the router 104 through a link 213. The router 104 is connected to the link 115 in the IP network 1.

As described before, the routers 102 and 104 are connected through the virtual circuit (VC) 21 which has been established via the ATM switches 201 and 202 in the ATM network 2. The routing information is transferred through the VC 21 in the ATM network 2 according to the routing protocol 124. In this example, the ATM network 2 has two possible alternative routes 22 and 23 in addition to the VC 21 between the routers 102 and 104.

The following embodiments of the present invention will be described, taking PNNI (private Network-Node Interface) routing as a dynamic routing protocol.

Figure 3:
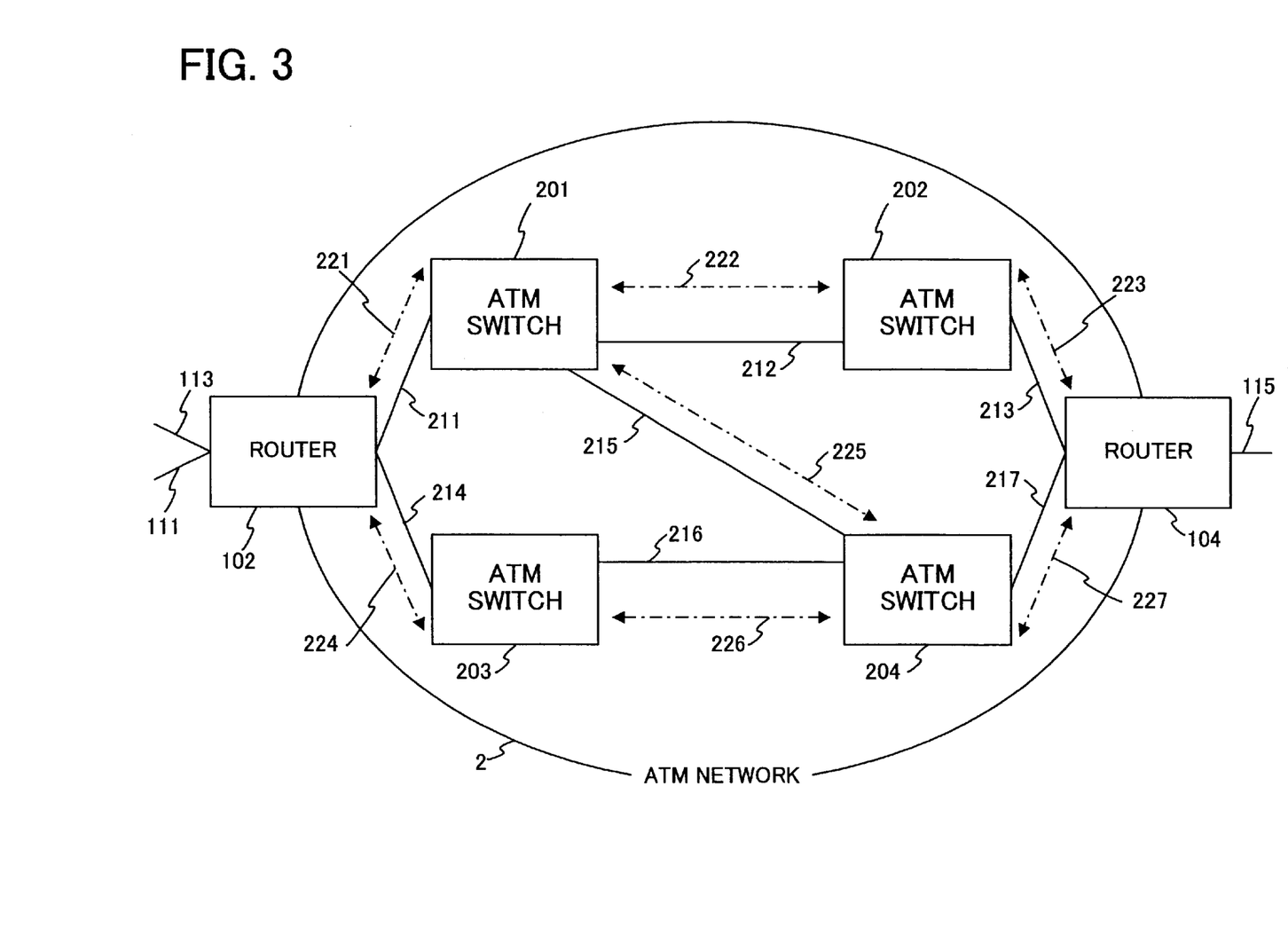
FIG. 3 is a schematic diagram showing a configuration of the ATM network included in the IP network for explanation of a dynamic routing protocol according to the present invention.

As shown in FIG. 3, the topology information and the link resource information for each link are exchanged on the links within the ATM network 2 according to the PNNI routing protocol 221–227. The information exchanged according to the PNNI routing protocol 221–227 is distributed to all the nodes in the ATM network 2.

First Embodiment

Figure 4:
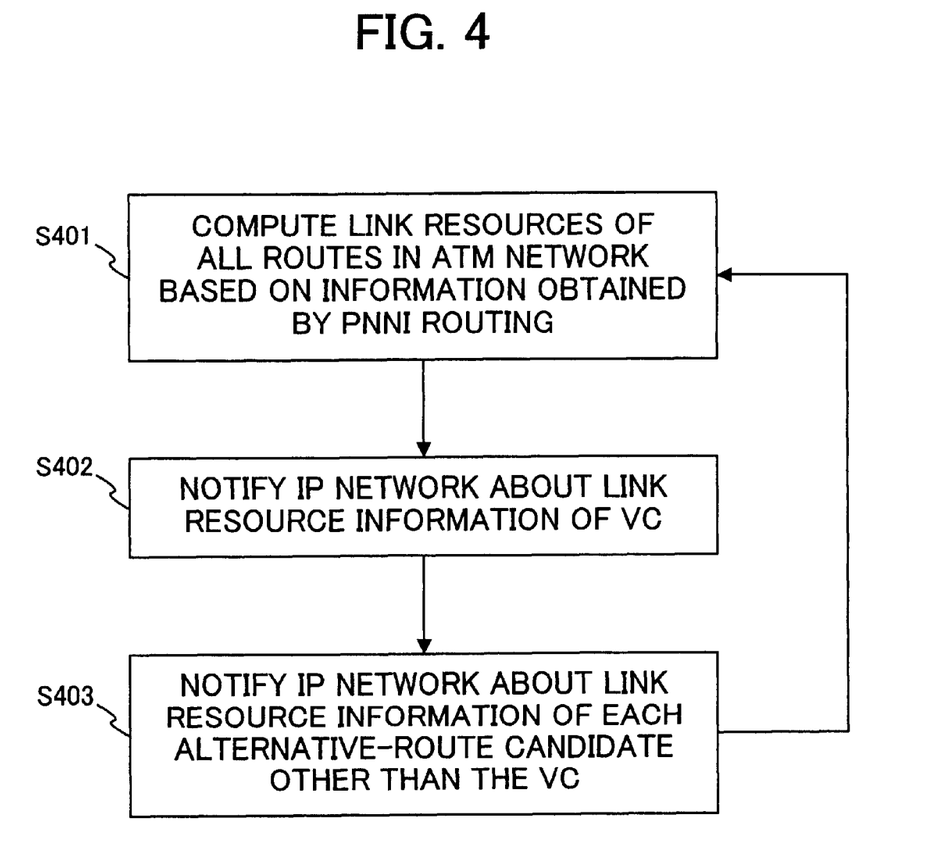
FIG. 4 is a flowchart showing a routing information notifying method according to a first embodiment of the present invention.

Referring to FIG. 4, a router connected to both the IP network 1 and the ATM network 2 (here, the router 102 or the router 104) computes the link resources of all the possible routes (including the default VC 21) between the routers 102 and 104 in the ATM network 2 based on information obtained by the PNNI routing protocol 2212–227 (step 3401). Then, the router notifies the IP network 1 about the link resource information of the default VC 21 according to the routing protocol of the IF network 1 (step S402). Thereafter, the router selects each alternative route (or a plurality of alternative routes) other than the default VC 21 and notifies the IP network 1 about the link resource information of each selected alternative route according to the routing protocol of the IP network 1 (step S403).

For instance, in the case where the alternative routes 22 an 23 are selected in the step S403 as shown in FIG. 2 the router can notify the IP network 1 about the link resource information of these selected alternative routes 22 and 23 together with that of the default VC 21. In this case, the link resource information thereof may be provided with additional information indicating that these selected alternative routes 22 and 23 are a possible alternative route which has not been established currently.

As described above, since the link resource information of alternative routes can be transferred to the IP network 1 in addition to the link resource information of the default VC 21, a range of selectable routes in the ATM network 2 can be widened, resulting in increased efficiency of the network resources. It should be noted that the link resource information In the ATM network 2 can be automatically produced from information periodically obtained based on the PNNI routing protocol as described above.

Second Embodiment

According to a second embodiment of the present Invention, the router selects an alternative route which satisfies a predetermined QoS requirement and notifies the IP network 1 about the link resource information of each selected alternative route according to the routing protocol of the IP network 1.

Figure 5:
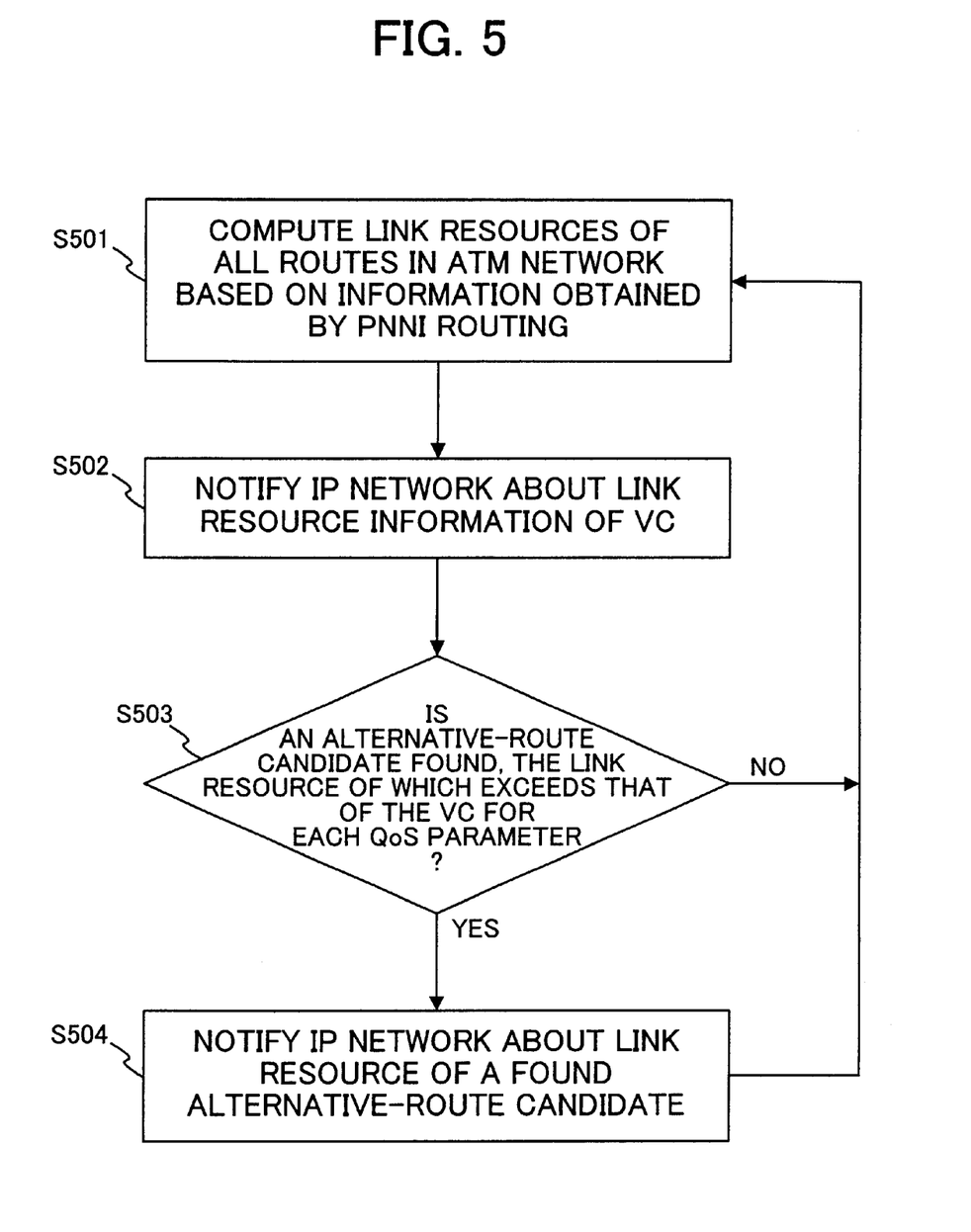
FIG. 5 is a flowchart showing a routing information notifying method according to a second embodiment of the present invention.

Referring to FIG. 5, a router connected to both the IP network 1 and the ATM network 2 (here, the router 102 or the router 104) computes the link resources of all the possible routes (including the default VC 21) between the routers 102 and 104 in the ATM network 2 based on information obtained by the PNNI routing protocol 221–227 (step S501). Then, the router notifies the IP network 1 about the link resource information of the default VC 21 according to the routing protocol of the IP network 1 (step S502).

Thereafter, the router searches for an alternative-route candidate having the link resource which exceeds the link resource of the default VC 21 in terms of each QoS parameter in the ATM network 2 (step S503). If such an alternative-route candidate is found (YES in step S503), then the router notifies the IP network about the link resource information of the found alternative-route candidate (step S304). If no hit is found (NO in step S503), the notification of the link resource of an alternative route is not performed If two or more candidates satisfying the requirement of the QoS parameter are found, all the found alternative-route candidates may be selected to notify the IP network 1. Alternatively, only one alternative-route candidate selected from the alternative-route candidates satisfying the requirement of the QoS parameter can be selected to notify the IP network 1. Since the IP network 1 is notified about the link resource of only one alternative-route candidate, only necessary link resource information can be transferred in the IP network 1, resulting in decreased traffic in the IP network 1. The selection criteria is designed, for example, such that the alternative-route candidate having the maximum link resource is selected among a plurality of alternative-route candidates satisfying the requirement of the QoS parameter. Such a selection operation can be an equivalent such that the possible routes in the ATM network 2 are reduced to a representative route.

As described above, according to the second embodiment, only necessary link resource information can be transferred in the IP network 1 and notification of link resource information more than necessary can be preventer.

Third Embodiment

In the first and second embodiments as describe above, the link resource of each possible route candidate in the ATM network 2 is periodically computed based on information obtained by PNNI routing protocol. However, amounts of computations of the possible route resources become large in a large scale ATM network and the time required for the computations is not negligible.

According to a third embodiment of the present invention, the router normally computes only the link resource of the default VC 21 and notified the IP network 1. When the default VC 21 becomes short of link resource, however, the router computes the link resource of an alternative route In the ATM network 2 and notifies the IP network.

Figure 6:
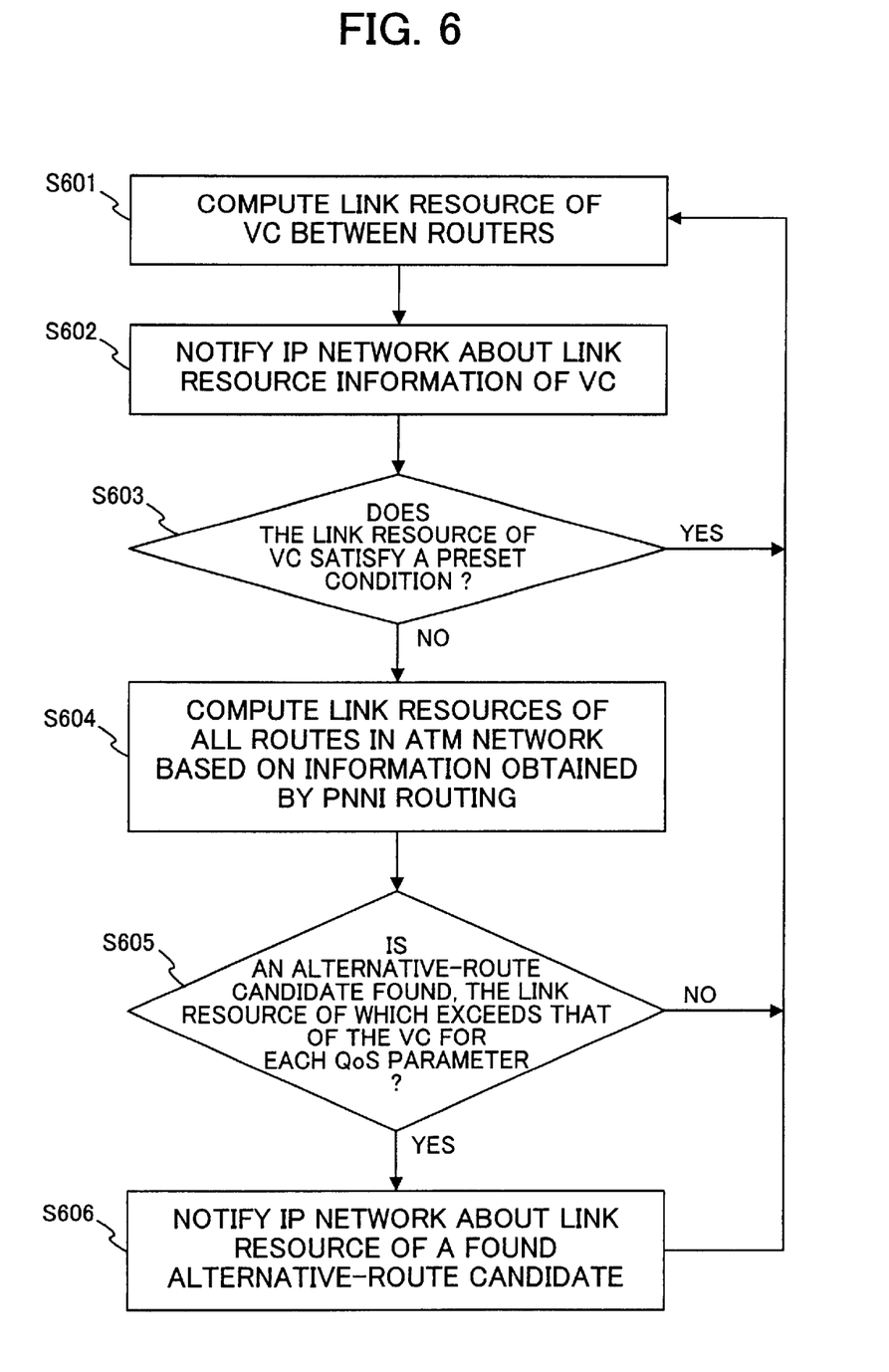
FIG. 6 is a flowchart showing a routing information notifying method according to a third embodiment of the present invention.

Referring to FIG. 6, the lint resource of the default VC 21 of the ATM network 2 between the routers 102 and 104 is computed (step S601) and the IP network 1 is notified about the link resource information of the default VC 21 according to the routing protocol of the IP network 1 (step 5602) The link resource of the default VC 21 may be computed based on information obtained by the PNNI routing protocol 221–227 or may be computed by another computation method.

Thereafter, it is determined whether the link resource of the default VC 21 to equal to or greater than a preset value (step S603). This preset value is a value in terms of a predetermined QoS parameter such as a required bandwidth or a plurality of QoS predetermined parameters. If the link resource of the default VC 21 is not smaller than the preset value. In other words, the default VC 21 satisfies the preset quality condition (YES in step S603), the alternative-route search is not performed and the control goes back to the step S601. If the default VC 21 does not satisfy the preset quality condition (NO in step S603), the link resources of all the possible routes between the routers 102 and 104 in the ATM network 2 are computed based on information obtained by the PNNI routing protocol 221–227 (step S604).

Thereafter, the router searches for an alternative-route candidate having the link resource which exceeds the link resource of the default VC 21 in terms of each QoS parameter in the ATM network 2 (step S605). If such an alternative-route candidate is found (YES in step S605), then the router notifies the IP network about the link resource information of the found alternative-route candidate (step S606). If no hit is found (NO in step S605), the notification of the link resource of an alternative route is not performed.

If two or more candidates satisfying the requirement of the QoS parameter are found, all the found alternative-route candidates may be selected to notify the IP network 1. Alternatively, only an alternative-route candidate selected from the alternative-routo candidates satisfying the requirement of the QoS parameter can be transferred to the. IP network 1 Since the IP network 1 is notified about the link resource of only one alternative-route candidate, only necessary link resource information can be transferred in the IP network 1, resulting in decreased traffic in the IP network 1. The selection criteria is designed, for example, such that the alternative-route candidate having the maximum link resource is selected among a plurality of alternative-route candidates satisfying the requirement of the QoS parameter.

Such a selection operation can be an equivalent such that the possible routes of the ATM network 2 are reduced to a representative route.

As described above, according to the third embodiment, only the link resource of the default VC 21 Is normally computed and notified the IP network 1. However, when the default VC 21 becomes short of link resource, the link resource of an alternative route in the ATM network 2 is computed and notifies the IP network. Therefore, 1n the case where the default VC 21 can provide a sufficient link resource, another link resource of an alternative route in the ATM network 2 is prevented from being transferred to the IP network 1, resulting in reduced amount of link resource information transferred to the IP network 1.

As described before, amounts of computations of the possible route resources become large in a large scale ATM network and the time required for the computations is not negligible. However, according to the third embodiment, such a computation in not performed as long as the default VC 21 satisfies the preset condition Therefore, the third embodiment has a remarkable advantage especially in the case of large-scale ATM network.

Fourth Embodiment

According to a fourth embodiment of the present invention, when the default VC 21 does not satisfy the preset condition, link resources of the alternative routes are not all computed based on information obtained by PNNI routing protocol but the link resource of a selected alternative-routo candidate which can cover a short fall of the default VC in link resource. In this embodiment, in addition to the default VC 21, route candidates 22 and 23 are previously selected as an alternative route whose link resource Is to be computed.

Figure 7:
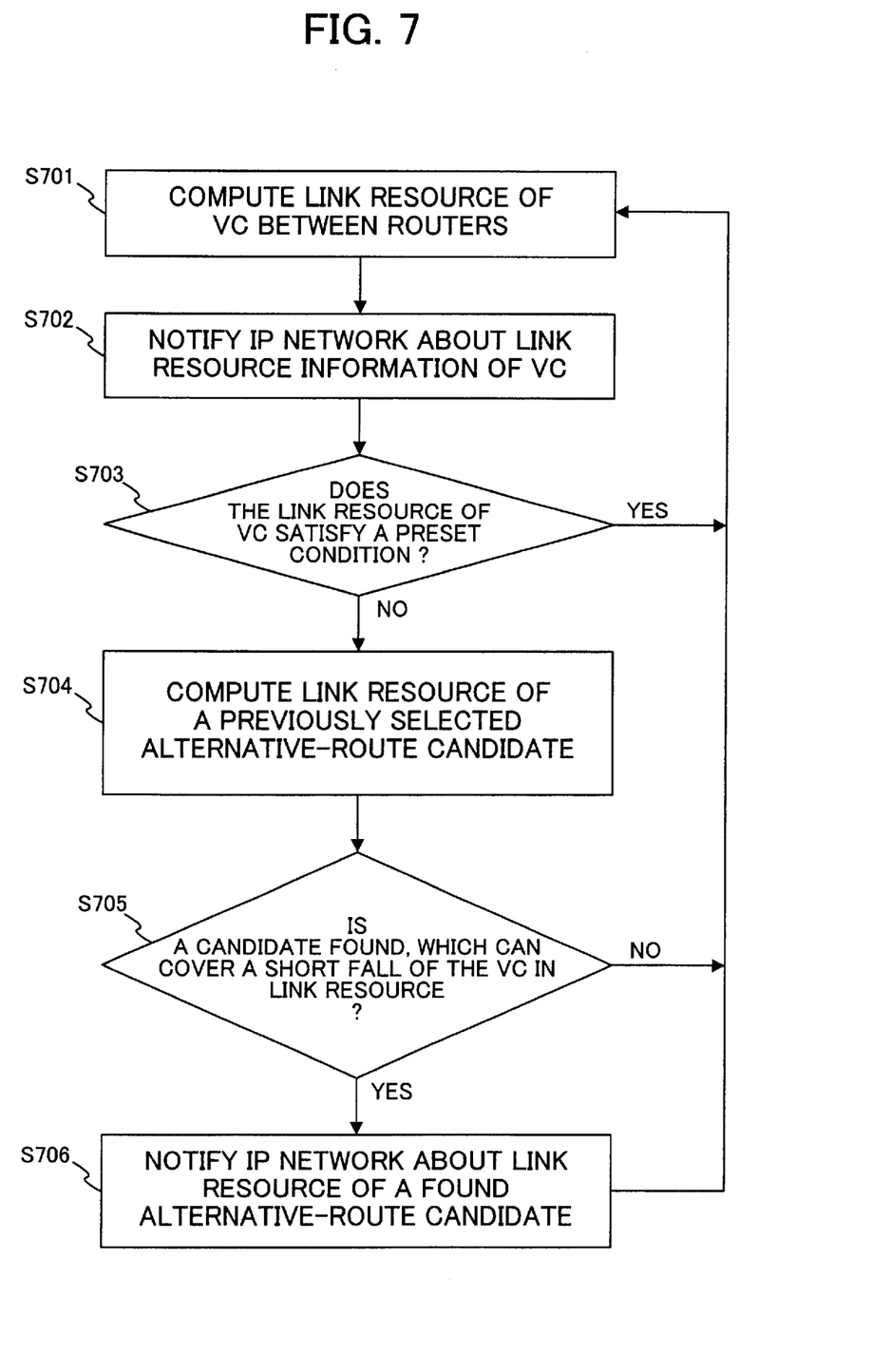
FIG. 7 is flowchart showing a routing information notifying method according to a fourth embodiment of the present invention.

Referring to FIG. 7, the link resource of the default VC 21 of the ATM network 2 between the routers 102 and 104 is computed (step S701) and the IP network is notified about r the link resource information of the default VC 21 according to the routing protocol of the IP network 1 (step S702). The link resource of the default VC 21 may be computed based on information obtained by the PNNI routing protocol 221–227 or may be computed by another computation method.

Thereafter, it is determined whether the link resource of the default VC 21 is equal to or greater than a preset value (step S703) This preset value is a value in terms of a predetermined QoS parameter or a plurality of QoS predetermined parameters. If the link resource of the default VC 21 is not smaller than the preset value such as a predetermined QOS parameter, in other words, the default VC 21 satisfies the preset quality condition (YES in step S703), the alternative-route search it not performed and the control goes back to the step S701. If the default VC 21 does not satisfy the preset quality condition (NO in step S703), the link resources of the previously selected alternative routes 22 and 23 are computed (stop S704).

Thereafter, an alternative-route candidate having the link resource which can cover a short fall of the default VC 21 in terms of the predetermined QoS parameter is searched for (step S705). If such an alternative-route candidate which can cover the short fall of the default VC 21 most effectively is found (YES in step 5705), then the IP network 1 is notified about the link resource information of the found alternative-route candidate (step S706). The link resource information of a plurality of found alternative-route candidates can be transferred to the IP network 1 as necessary. If no hit is found (NO instep S705), the notification of an alternative-route link resource is not performed.

For example, in the case where the alternative route 22 can provide a link resource which can most effectively cover a short fall of the default VC 21, the IP network 1 is notified about the link resource information of both the default VC 21 and the alternative route 22 according to the routing protocol. In this case, the link resource information of the other alternative route 23 may be transferred to the IP network 1 if it can cover the short fall of the default VC 21. It is not necessary to notify the IP network 1 about the link resource information of the other alternative route 23. If it cannot cover the short fall of the default VC 21, such notification In not performed.

As described above, according to the fourth embodiment, when the default VC 21 does not satisfy the preset condition, link resources of the alternative routes are not all computed based on information obtained by PNNI routing protocol but the link resource of a selected alternative-route candidate which can cover a short fall of the default VC in link resource. In other words, since at least one alternative-route candidate is previously selected, an alternative route can be rapidly selected and the present embodiment can be applied to an ATM network without PNNI routing protocol.

EXAMPLES

Hereafter, three respective examples according to the second to fourth embodiments will be described with reference to FIG. 8.

Figure 8:
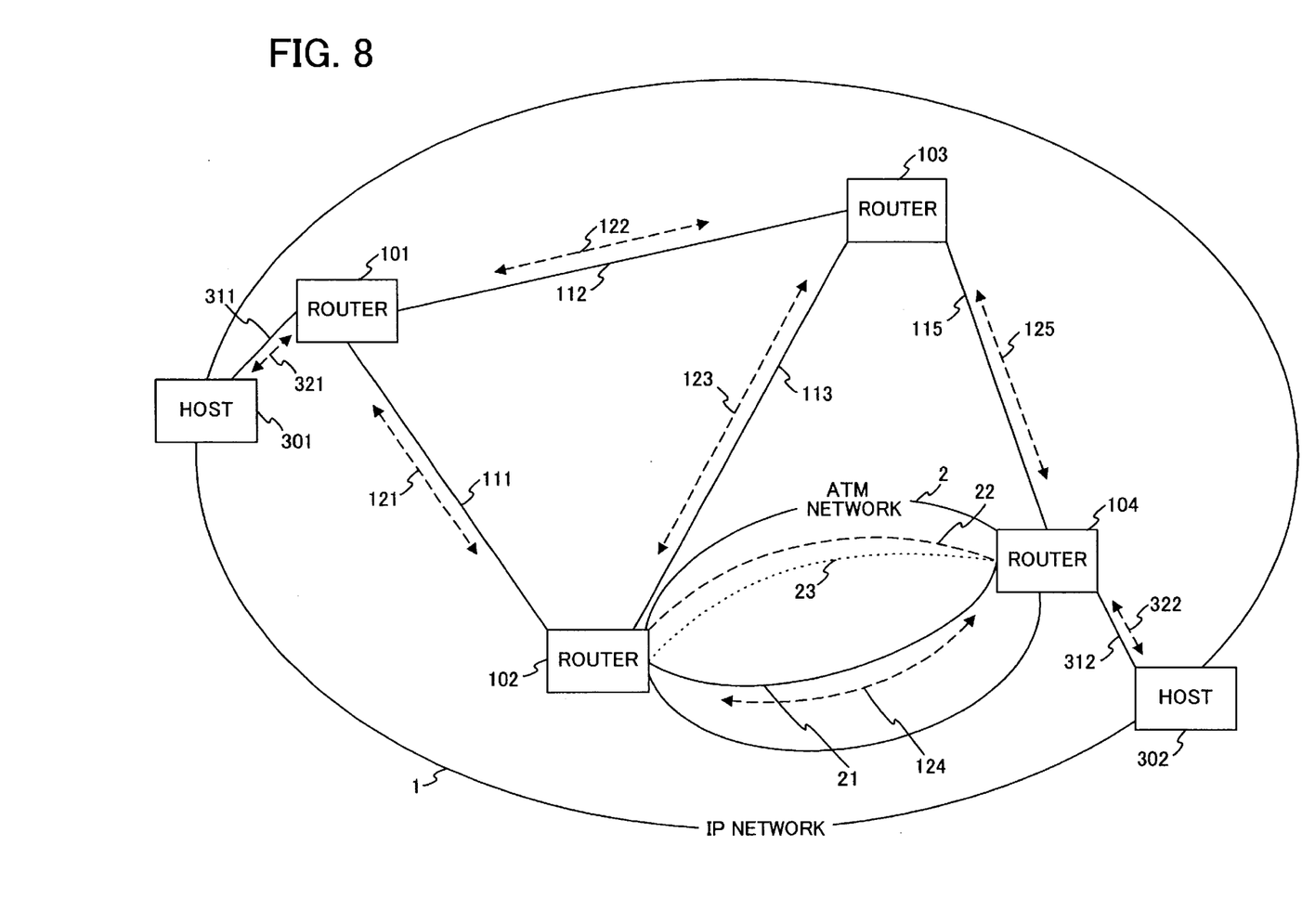
FIG. 8 is a schematic diagram showing a configuration of the network composed of the IP network including the ATM network for explanation of operations of the above embodiments according to the present invention.

Referring to FIG. 8, a network is composed of the IP network 1 including the ATM network 2 through which the routers 102 and 104 can be connected to each other Further, the respective routers 101 and 102 are connected to hosts 301 and 302 through links 311 and 312. It is assumed that the ATM network 2 can provide the default VC 21 and the possible alternative routes 22 and Z3.

Example 1

According to the second embodiment of the present invention, the link resource information of each link is distributed to the routers 101–104 and the hosts 301 and 302 in QOSPF and an alternative route which satisfies the required QoS (here, bandwidth) and has the maximum available bandwidth is searched for based on information obtained by PNNI routing. If an alternative-route candidate having the link resource which exceeds the link resource of the default VC 21 in terms of the required bandwidth in the ATM network 2 is found, then the IP network is notified about the link resource information of the found alternative-route candidate.

It is assumed that the bandwidth of the default VC 21 is 5M bits/second (bps) and the bandwidth of the alternative route 22 is 15M bps that is computed from information obtained by PNNI routing. In this case, in addition to the link resource information of the default VC 21, the link resource information of the alternative route 22 is also distributed to each router and host In QOSPF (Quality of Service Path First) routing in the IP network 1.

Example 2

According to the third embodiment of the present Invention, when the default VC 21 becomes short of link resource in the required QOS parameter (here, bandwidth) the link resources of all the possible routes between the routers 102 and 104 in the ATM network 2 are computed based on information obtained by the PNNI routing and thereafter an alternative-route candidate having the link resource which exceeds the link a resource of the default VC 21 in terms of the required bandwidth is searched for. If an alternative-route candidate satisfying the requirement Is found, then the IP network is notified about the link resource information of the found alternative-route candidate.

It is assumed that the bandwidth of the default VC 21 is 5M bits/second (bps) and the required bandwidth is 10M bps. Since the default VC 21 does not satisfy the required QoS, an alternative-route candidate having more than 10M bps is searched for by computing link resources of alternative routes in the ATM network 2 using information obtained by PNNI routing. If the alternative route 22 has a bandwidth of 15M bps which is the maximum among the possible alternative routes, then In addition to the link resource information of the default VC 21, the link resource information of the alternative route 22 is also distributed to each router and host through QOSPF In the IP network 1.

Example 3

According to the fourth embodiment of the present invention, when the default VC 21 does not satisfy the required QoS (bandwidth), the link resources of the previously selected alternative-route candidates are computed. Here, It is assumed that the route candidates 22 and 23 are previously selected as an alternative route and the respective computed bandwidths thereof are 15M bps and 12M bps. An alternative route having 10M bps or more which can cover a short fall of the default VC in bandwidth is searched for.

In this example, the alternative route 22 has a bandwidth of 15M bps that is larger than the other alternative route 23. Therefore, in addition to the lint resource information of the default VC 21, the link resource information of the alternative route 22 is also distributed to each router and host through QOSPF in the IP network 1. Alternatively, in addition to the link resource information of the alternative route 22, the link resource information of the alternative route 23 may be distributed to each router and host through QOSPF because the bandwidth of the alternative route 23 exceeds 10M bps In the above examples 1 to 3, the link resource information of the default VC 21 having a bandwidth of 5M bps and the link resource information or the alternative route 22 having a bandwidth of 15M bps are distributed to each router and each host in the IP network 1. In other words, according to the present Invention, QoS route reservation can be achieved using the link, resource information of an alternative route candidate which has not been realized by an actual virtual circuit (VC). The procedure of the QoS router reservation will be described hereafter.

In FIG. 8, consider the case where a route having a bandwidth of 10M bps is reserved according to RSVP (Resource reSerVation Protocol). It is assumed that a sufficient bandwidth more than 10M bps is available in all links other that the link 115 (less than 10M bps) and the ATM network 2 in which the VC 21 has 1M bps.

In such a case, since both the link 115 and the VC 21 in the ATM network 2 cannot provide an available bandwidth more than 10M bps, they cannot be used. Therefore, the router 101 determines that the alternative route 22 of the ATM network 2 can be used to generate a path having a bandwidth of 10M bps or more from the host 301 to the host 302. When receiving a PATH message from the host 301, the router 101 transfers it to the router 102.

The router 102, when receiving the PATH message from the router 101, determines that no virtual circuit (VC) having a bandwidth of 10M bps or more exists between the routers 102 and 104, and then tries to set up a new VC having a CBR (Constant Bit Rate) of 10M bps, or more than 10M bps as necessary, between the routers 102 and 104. The PNNI signaling is used to set up the new VC. The router 102 searches for an alternative route having a bandwidth of 10M bps available in the ATM network 2. In this example, the alternative route 22 is used to set up the new VC of 10 Mbps-CBR.

After having completed the setup of the new VC, the PATH message is transferred to the router 104 through the new VC and then to the host 302. When receiving the PATH message from the router 104, the host 302 sends a RESV message back to the host 301 along a path through which the PATH message has traveled in the reverse direction.

In this way, the required bandwidth of 10 Mbps is reserved between the hosts 301 and 302 through the ATM network 2. The actual path is: host 301-link 311-router 101-link 111-router 102-alternative route 22 (10 Mbps-CBR VC)-router 104-link 312-host 302.

After the alternative route 22 has been set to the now VC in the ATM network 2, the link resource information of the alternative route 22 is periodically distributed together with the link resource information of the default VC 21 according to QOSPF. The link resource information of the alternative route 22 includes information indicating that the 10 Mbps reservation has been made and the remaining bandwidth is 5 Mbps.

When the link resource of the established VC is not needed, the established VC may be released or held for other reservation.

What is claimed is:

1. In a network composed of a connectionless network including a connection-oriented network, wherein at least two routers are connected to each other through a virtual circuit established in the connection-oriented network, a method for notifying the connectionless network about link resource information of the connection-oriented network, comprising the steps of:

a) searching for an alternative route to the virtual circuit in the connection-oriented network; and    b) notifying the connectionless network about a link resource of the alternative route found in the connection-oriented network.

2. The method according to claim 1, wherein in the step b), the connectionless network is notified about link resources of all alternative routes found in the connection-oriented network.

3. The method according to claim 1, wherein the step a) comprises the steps of:

a.1) computing a link resource of each route in the connection-oriented network; and    a.2) searching for an alternative route satisfying required quality base on the link resource of each route.

4. The method according to claim 1, wherein the step a) comprises the steps of:

a.1) computing a link resource of each route in the connection-oriented network; and    a.2) searching for an alternative route having a link resource exceeding a link resource of the virtual circuit base on the link resource of each route.

5. In a network composed of a connectionless network including a connection-oriented network, wherein at least two routers are connected to each other through a virtual circuit established in the connection-oriented network, a method for notifying the connectionless network about link resource information of the connection-oriented network, comprising the steps of:

a) determining whether a link resource of the virtual circuit satisfies required quality;

b) notifying the connectionless network about only the link resource of the virtual circuit, when the link resource of the virtual circuit satisfies the required quality;

c) searching for an alternative route to the virtual circuit in the connection-oriented network, when the link resource of the virtual circuit does not satisfy the required quality; and d) notifying the connectionless network about a link resource of the alternative route found in the connection-oriented network.

6. The method according to claim 5, wherein the step c) comprises the steps of:

c.1) computing a link resource of each route in the connection-oriented network; and c.2) searching for an alternative route satisfying required quality base on the link resource of each route.

7. The method according to claim 5, wherein the step c) comprises the steps of:

c.1) computing a link resource of each route in the connection-oriented network; and c.2) searching for an alternative route having a link resource exceeding a link resource of the virtual circuit base on the link resource of each route.

8. The method according to claim 5, wherein the step c) comprises the steps of:

c.1) computing a link resource of a previously selected route in the connection-oriented network; and c.2) searching for an alternative route satisfying required quality base on the link resource of the previously selected route.

9. The method according to claim 8, wherein the step c.2) comprises the step of searching for an alternative route having a link resource capable of covering a short fall of the virtual circuit in link resource.

10. The method according to claim 1, wherein the connectionless network is an IP network and the connection-oriented network is an ATM network.

11. The method according to claim 5, wherein the connectionless network is an IP network and the connection-oriented network is an ATM network.

12. A quality-ensuring routing method in a network composed of a connectionless network including a connection-oriented network, wherein the connectionless network includes a plurality of routers and at least two routers thereof are connected to each other through a virtual circuit established in the connection-oriented network, comprising the steps of:

a) searching for an alternative route to the virtual circuit in the connection-oriented network;

b) distributing link resource information of the alternative route found in the connection-oriented network to each router included in the connectionless network; and c) determining a path with required quality through the connection-oriented network by referring to the link resource information of the alternative route.

13. The quality-ensuring routing method according to claim 12, wherein in the step b), link resources of all alternative routes found in the connection-oriented network are distributed to the connectionless network.

14. The quality-ensuring routing method according to claim 12, wherein the step a) comprises the steps of:

a.1) computing a link resource of each route in the connection-oriented network; and a.2) searching for an alternative route satisfying required quality base on the link resource of each route.

15. The quality-ensuring routing method according to claim 12, wherein the step a) comprises the steps of:

a.1) computing a link resource of each route in the connection-oriented network; and a.2) searching for an alternative route having a link resource exceeding a link resource of the virtual circuit base on the link resource of each route.

16. A quality-ensuring routing method in a network composed of a connectionless network including a connection-oriented network, wherein the connectionless network includes a plurality of routers and at least two routers thereof are connected to each other through a virtual circuit established in the connection-oriented network, comprising the steps of:

a) determining whether a link resource of the virtual circuit satisfies required quality;

b) distributing only the link resource of the virtual circuit to each router included in the connectionless network, when the link resource of the virtual circuit satisfies the required quality;

c) searching for an alternative route to the virtual circuit in the connection-oriented network, when the link resource of the virtual circuit does not satisfy the required quality;

d) distributing a link resource of the alternative route found in the connection-oriented network to each router included in the connectionless network; and e) determining a path with required quality through the connection-oriented network by referring to the link resource information of the alternative route.

17. The quality-ensuring routing method according to claim 16, wherein the step c) comprises the steps of:

c.1) computing a link resource of each route in the connection-oriented network; and c.2) searching for an alternative route satisfying required quality base on the link resource of each route.

18. The quality-ensuring routing method according to claim 16, wherein the step c) comprises the steps of:

c.1) computing a link resource of each route in the connection-oriented network; and c.2) searching for an alternative route having a link resource exceeding a link resource of the virtual circuit base on the link resource of each route.

19. The quality-ensuring routing method according to claim 16, wherein the step c) comprises the steps of:

c.1) computing a link resource of a previously selected route in the connection-oriented network; and c.2) searching for an alternative route satisfying required quality base on the link resource of the previously selected route.

20. The quality-ensuring routing method according to claim 19, wherein the step c.2) comprises the step of searching for an alternative route having a link resource capable of covering a short fall of the virtual circuit in link resource.

21. The quality-ensuring routing method according to claim 12, wherein the connectionless network is an IP network and the connection-oriented network is an ATM network.

22. The quality-ensuring routing method according to claim 16, wherein the connectionless network is an IP network and the connection-oriented network is an ATM network.

23. A router connecting a connectionless network and a connection-oriented network, wherein at least two routers are connected to each other through a virtual circuit established in the connection-oriented network, comprising:

a searcher for searching for an alternative route to the virtual circuit in the connection-oriented network; and a distributor for distributing link resource information of the alternative route found in the connection-oriented network to other routers included the connectionless network.

24. The router according to claim 23, wherein the distributor distributes link resources of all alternative routes found in the connection-oriented network to the connectionless network.

25. The router according to claim 23, wherein the searcher computes a link resource of each route in the connection-oriented network and then searches for an alternative route satisfying required quality base on the link resource of each route.

26. The router according to claim 23, wherein the searcher computes a link resource of each route in the connection-oriented network and then searches for an alternative route having a link resource exceeding a link resource of the virtual circuit base on the link resource of each route.

27. The router according to claim 23, further comprising:

a determining section for determining whether a link resource of the virtual circuit satisfies required quality, wherein when the link resource of the virtual circuit satisfies the required quality, the distributor distributes only the link resource of the virtual circuit to each router included in the connectionless network, and when the link resource of the virtual circuit does not satisfy the required quality, the searcher searches for an alternative route to the virtual circuit in the connection-oriented network and then the distributor distributes a link resource of the alternative route found in the connection-oriented network to each router included in the connectionless network.

28. The router according to claim 27, wherein the searcher computes a link resource of each route in the connection-oriented network and then searches for an alternative route satisfying required quality base on the link resource of each route.

29. The router according to claim 27, wherein the searcher computes a link resource of each route in the connection-oriented network and then searches for an alternative route having a link resource exceeding a link resource of the virtual circuit base on the link resource of each route.

30. The router according to claim 27, wherein the searcher computes a link resource of a previously selected route in the connection-oriented network and then searches for an alternative route satisfying required quality base on the link resource of the previously selected route.

31. The router according to claim 30, wherein the searcher further searches for an alternative route having a link resource capable of covering a short fall of the virtual circuit in link resource.

* * * * *